United States Patent
Monkelbaan

(10) Patent No.: US 7,445,199 B2
(45) Date of Patent: Nov. 4, 2008

(54) APPARATUS AND PROCESS FOR DISTRIBUTING LIQUID

(75) Inventor: Daniel R. Monkelbaan, Amherst, NY (US)

(73) Assignee: UOP LLC, Des Plaines, IL (US)

( * ) Notice: Subject to any disclaimer, the term of this patent is extended or adjusted under 35 U.S.C. 154(b) by 286 days.

(21) Appl. No.: 11/468,328

(22) Filed: Aug. 30, 2006

(65) Prior Publication Data

US 2008/0054502 A1 Mar. 6, 2008

(51) Int. Cl.
*B01F 3/04* (2006.01)

(52) U.S. Cl. ............................. 261/97; 261/110; 203/71

(58) Field of Classification Search ................... 261/97, 261/110, 114.1, 114.5; 202/262; 203/71
See application file for complete search history.

(56) References Cited

U.S. PATENT DOCUMENTS

| | | | | |
|---|---|---|---|---|
| 3,313,420 A | * | 4/1967 | Adler | 210/275 |
| 3,410,540 A | | 11/1968 | Bruckert | 261/113 |
| 4,045,523 A | * | 8/1977 | Goettl | 261/97 |
| 4,202,774 A | * | 5/1980 | Kos | 210/274 |
| 4,729,857 A | | 3/1988 | Lee et al. | 261/97 |
| 4,863,568 A | * | 9/1989 | Wijn | 202/185.2 |
| 5,051,214 A | * | 9/1991 | Chen et al. | 261/97 |
| 5,061,407 A | * | 10/1991 | Nutter | 261/96 |
| 5,407,605 A | | 4/1995 | Resetarits et al. | 261/98 |
| 5,523,062 A | | 6/1996 | Hearn et al. | 422/195 |
| 5,707,563 A | | 1/1998 | Monkelbaan et al. | 261/98 |
| 6,045,762 A | * | 4/2000 | Chuang et al. | 422/195 |
| 6,371,454 B1 | | 4/2002 | Gerla et al. | 261/114.1 |
| 6,511,053 B2 | | 1/2003 | Kaibel et al. | 261/112.2 |
| 6,568,663 B1 | | 5/2003 | Xu et al. | 261/114.1 |
| 6,722,639 B2 | * | 4/2004 | Ender et al. | 261/97 |
| 2001/0015504 A1 | | 8/2001 | Bosmans et al. | 261/114.1 |

* cited by examiner

*Primary Examiner*—Scott Bushey
(74) *Attorney, Agent, or Firm*—Maryann Maas

(57) ABSTRACT

A liquid distributor for use in a column having distillation trays has been developed. The liquid distributor functions to uniformly distribute a descending liquid stream across the tray for interaction with an ascending vapor stream. The liquid distributor has a feed pipe which delivers the liquid stream to an underlying elongated trough. Liquid discharge holes are positioned in the floor of the trough. A perforated v-plate positioned within the trough so that liquid from the feed pipe passes through the perforated v-plate before encountering the floor of the trough. When liquid passes through the perforated v-plate, the stream is divided into smaller streams of lower velocity, providing a more uniform overall flow rate of liquid passing through the trough. Liquid is then delivered from the discharge outlets of the trough onto the upper surface of the tray with a substantially uniform flow rate across the trough.

8 Claims, 5 Drawing Sheets

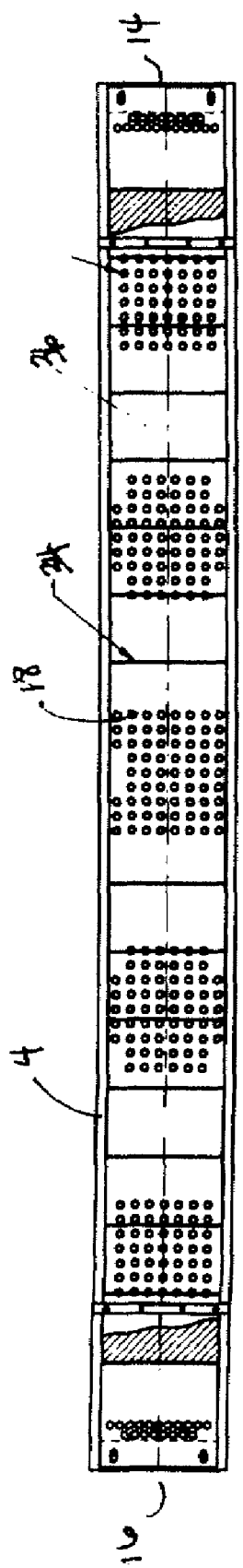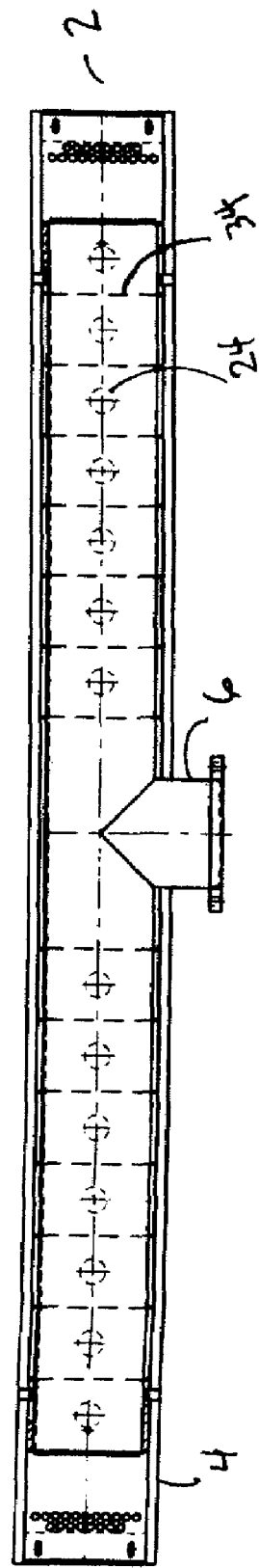
FIG. 1
FIG. 2

APPARATUS AND PROCESS FOR DISTRIBUTING LIQUID

FIELD OF THE INVENTION

The present invention relates in general to liquid distributors typically used in mass transfer columns and methods of distributing liquid using the liquid distributors.

BACKGROUND OF THE INVENTION

Various types of exchange columns in which a gas and a liquid come into contact with one another for purposes of mass or heat transfer, fractionation and or separation of feed stock constituents, and other unit operations are known in the art. Counter-current flow of vapor and liquid within such exchange columns have become established methods of vapor-liquid contact. The actual vapor-liquid interface requires the use of distillation trays or a packing bed within the column. Liquid is distributed above the trays or packing bed while vapor is distributed beneath the tray or packing bed. Liquid descend upon a tray or trickling downwardly through the packing bed is exposed to the vapor ascending upwardly for vapor-liquid contact and interaction.

The configuration of the column internals determines the efficiency of the vapor-liquid interface and the concomitant mass and energy transfer occurring in a process tower. Effective and even distribution of the vapor and the liquid on opposite sides of the distillation tray or packing bed creating homogeneous mixing zones are also critical to an efficient operation. Uneven liquid distribution can lead to poor contact and mass transfer between ascending vapor streams and descending liquid streams. With efficiency being readily convertible to cost of operation and production quality, many designs exist today. However, the efficiency of the column can be limited by the efficiency of the vapor and liquid distribution across the column internals. For example, should either vapor or liquid fail to evenly distribute over a portion of distillation tray or packing bed, that portion will not be used to its full potential thus decreasing the efficiency and cost effectiveness of the operation. Therefore, aside from the trays and packing beds themselves, the liquid distributor is the most important unit of a tower internal. Failure in performance of a tower sometimes stems from liquid distribution problems such as clogging or uneven distribution.

When using packing beds, efficiency can be lost through small regions of non-homogenous interaction between the vapor and liquid. Many high efficiency packing designs require counter-current vapor-liquid flow through channels defined by opposed corrugations of sheets. If the initial liquid or gas distribution fails to enter a particular corrugation pattern, then precious surface area is lost in the packing until the liquid and vapor are urged to migrate into and interact through the unfilled regions of the packing. The result is poor efficiency. Better liquid distribution across the packing would reduce the problem, and to achieve better liquid distribution across the packing it is desirable to increase the uniform distribution of liquid of a parting box which in turn feeds a packed bed distributor. If the liquid entering a column is distributed more uniformly across each section of a parting box, each section of the parting box is able to deliver a more uniform liquid feed to a packed bed distributor. The novel liquid distributor of the present invention is able to function as a parting box feeding the correct amount of liquid in a uniform distribution to a packed bed distributor.

Although many prior art systems, such as spray orifices, pipes, perforated plates, apertured troughs and nozzles, are generally effective in distributing some vapor and some liquid to most portions of a tray or packed bed distribution system, uniform distribution is usually not obtained without a more sophisticated distribution apparatus. For example, simply spraying liquid on top of the tray often results in high concentrations of liquid flow in certain portions of the tray and less flow in others. Orifice distributors are generally susceptible to plugging, leading to uneven irrigation within the tower. Surface irregularities in a distributor pan occurring during manufacture likewise increase flow resistance of some perforations or induce liquid flow along the bottom of the pan which is a distinct disadvantage. Overall, any flow irregularity which focuses the flow in one area while reducing flow in other areas is deleterious to the efficiency of the operation.

It would be an advantage, to provide an assembly for even and uniform liquid distribution of the liquid onto a tray. Examples of previous designs include U.S. Pat. No. 6,722,639 and U.S. Pat. No. 4,729,857. U.S. Pat. No. 4,729,857 teaches a liquid flow distributor with a plurality of troughs formed with a downwardly tapering body section having holes formed therein for spewing liquid outwardly there from. Baffles are disposed outwardly of the lower tapering body sections of the trough for receiving the spew of liquid there from and evenly distributing the liquid flow downwardly. U.S. Pat. No. 6,722,639 teaches a liquid distributor that includes a plurality of elongated troughs that are spaced apart and extend across the column. A plurality of liquid discharge holes are positioned in side walls of the trough and are located in one or more pre-selected planes that are preferably spaced above a floor of the trough. Splash baffles are spaced outwardly from the trough side walls and include upper portions that are positioned to receive liquid exiting the troughs through the discharge holes. Lower portions of the splash baffles form a constricted discharge outlet in a plane below the trough for delivering liquid from the splash baffles to the underlying mass transfer bed. The splash baffles are vertically adjustable and are intended to be supported on the upper surface of the mass transfer bed so that the discharged liquid is delivered directly to the mass transfer bed, thereby reducing the opportunity for the falling liquid to become entrained in a vapor stream flowing upwardly through the mass transfer bed.

The present invention provides a novel liquid distribution assembly that is more efficient than those of the art, especially in situations where the velocity of the liquid in the flow pipe is high. In this high efficiency distributor system a uniform flow of liquid is maintained through a flow equalizing system. The apparatus contains a trough with patterned apertures, a perforated v-plate situated within the trough, and a flow pipe disposed above the trough. A preferred embodiment additionally has dividers situated within the perforated v-plate. The apparatus may be used to deliver a uniform distribution of liquid to a distillation tray. In some applications, the apparatus or multiples sets of the apparatus may be used as a parting box to deliver a uniform distribution of liquid to a packed bed distributor.

The flow pipe delivers multiphase liquid to an open trough equipped with discharge apertures, usually arranged in a specific pattern. In some embodiments, multiple flow pipes may deliver the liquid to a network of open troughs. The trough is commonly used in mass transfer columns to receive liquid from an overlying region and redistribute the liquid uniformly to the underlying tray. However, if the flow pipe were to discharge directly into the open trough, liquid would be discharged from the apertures of the trough at non-uniform flow rates. Those apertures directly in alignment with the discharge from the flow pipe might experience a higher flow rate of liquid, which those apertures out of alignment with the flow pipe discharge might experience a lower flow rate of liquid. With the inventive v-plate housed within the trough, the flow rate of the liquid discharging from the flow pipe is disrupted and modified so that the liquid flowing through the perforations of the v-plate and into the trough are more uniform. The homogeneity of the liquid flow rate is increased even further in the embodiment where the perforated v-plate is equipped with dividers. In an alternative embodiment multiple troughs act as a parting box to redistribute the liquid uniformly to a packed bed distributor.

SUMMARY OF THE INVENTION

In one embodiment, the present invention is directed to a liquid distributor for use in a mass transfer column having one or more distillation trays located in an open internal region within the column. The liquid distributor functions to uniformly distribute a descending liquid stream across the tray for interaction with an ascending vapor stream. The liquid distributor has at least one optional feed pipe which delivers the liquid stream to at least one underlying elongated trough that extends across the column. The trough has spaced apart first and second side walls that are interconnected by a floor. A plurality of liquid discharge holes are positioned in at least the floor. The liquid distributor further includes a perforated v-plate positioned within the trough so that liquid from the feed pipe passes through the perforated v-plate before encountering the floor of the trough. It is preferred that the plate be in shape of a "v" although multiples of the v shape are contemplated, such as a W shape. When liquid passes through the perforated v-plate, the stream is divided into smaller streams of lower velocity, providing a more uniform overall flow rate of liquid passing through the trough. The liquid is then delivered from the discharge outlets of the trough directly onto the upper surface of the tray with a substantially uniform flow rate across the trough.

In one embodiment, the liquid distributor further contains solid vertical dividers positioned perpendicular to the length of the plate, spanning the width of the plate, and extending within the volume defined by the v-plate. The dividers define zones along the length of the v-plate and provide at least a partial barrier to horizontal flow of liquid between zones. The dividers optionally allow for a zonal overflow channel which provides a path for liquid to flow between zones once the liquid level in the v-plate reaches a specific level. In yet another embodiment, the v-plate is supported within the trough by bracing supports.

In yet another embodiment of the invention, the liquid distributor is used in a mass transfer column having a packed bed distributor and one or more packed beds located in an open internal region within the column. The liquid distributor functions as a parting box to uniformly distribute a descending liquid stream across a packed bed distributor. In this embodiment, the troughs are present in a plurality of troughs extend across the column in a parallel relationship with the troughs being spaced apart to permit vapor to flow upwardly in the spacing between adjacent troughs. The liquid from the troughs is uniformly distributed to a packed bed distribution system positioned in the column below the troughs.

BRIEF DESCRIPTION OF THE DRAWINGS

In the accompanying drawings which form a part of the specification and are to be read in conjunction therewith, and in which like reference numerals are used to indicate like parts in the various views:

FIG. 1 is a top view of the trough having a pattern of apertures in a floor of the trough.

FIG. 2 is a top view of one embodiment of the liquid distributor assembly including the flow pipe, the v-plate, the dividers, and the trough.

DETAILED DESCRIPTION OF THE INVENTION

Figure 3:
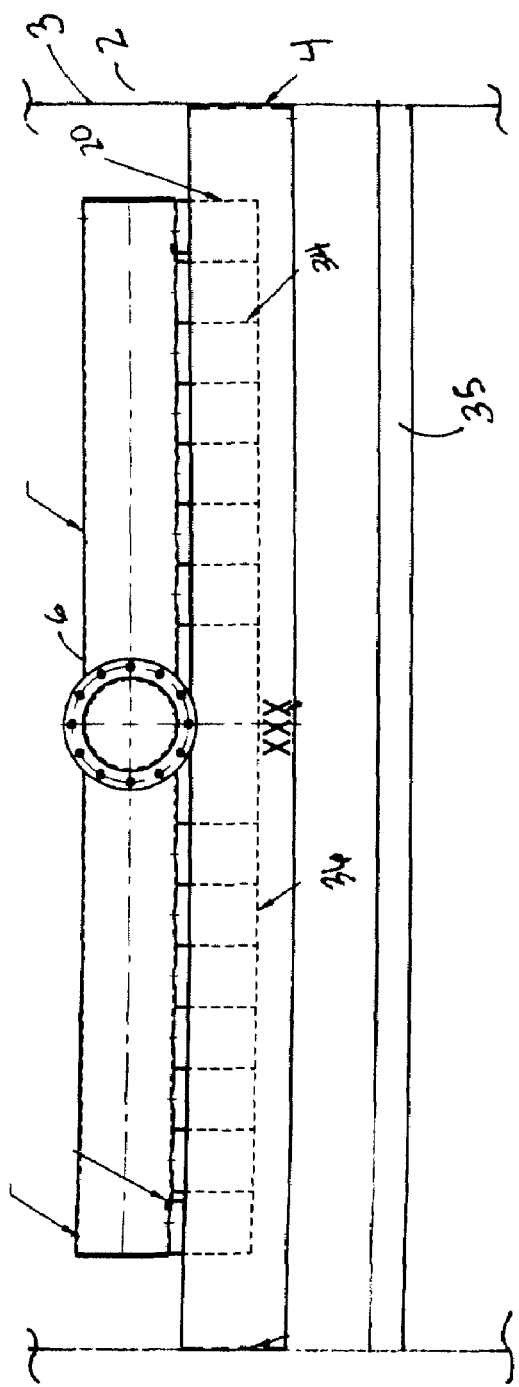
FIG. 3 is a side view of the liquid distributor assembly in a column positioned above a distillation tray or packed bed distributor.

Mass transfer or heat exchange columns include an upright cylindrical shell which defines an open interior region in which one or more liquid distributors of the present invention and one or more distillation trays are located. The liquid distributor is used to more uniformly distribute one or more descending liquid streams across the horizontal cross section of the distillation tray, which in turn facilitates contact between the descending liquid stream and one or more ascending vapor streams. Some columns employ one or more mass transfer beds instead of trays. The mass transfer bed comprises various known types of mass transfer devices, including but not limited to those conventionally known as structured, grid or random packing. Liquid is distributed to the beds using a packed bed distributor, which is typically fed from a packed bed parting box. The novel liquid distributor may be used instead of a more traditional packed bed parting box to more uniformly distribute liquid to the packed bed distributor.

The column is of a type used for processing liquid and vapor streams, including to obtain fractionation products. The column may have a cylindrical configuration or other shapes, including polygonal may be used. The column is of any suitable diameter and height, and is constructed from suitably rigid materials that are preferably inert to, or otherwise compatible with, the fluids and conditions present within the column.

Liquid streams are directed to the column through feed lines positioned at appropriate locations along the height of the column. Feed lines will normally carry only liquid, but may carry vapor with the liquid or in place of the liquid. The column also includes at least an overhead line for removing a vapor product or byproduct and a bottom stream takeoff line for removing a liquid product or byproduct from the column. Other column components such as reflux stream lines, reboilers, condensers, vapor horns and the like may also be present.

Turning now to FIGS. 1, 2, 3, and 5, the liquid distributor 2 preferably includes an elongated trough 4 which receives liquid from a liquid stream conducted in flow pipe 6. Flow pipe 6 has a series of exit holes 24 to discharge the liquid. Flow pipe 6 is positioned above trough 4 to allow gravity to aid in the introduction of the liquid. Flow pipe 6 typically has a diameter ranging from about 5 to about 91 cm (about 2 to about 36 inches), although larger diameters are also suitable. The collective area of exit holes 24 typically amount to less than fifty percent of the cross section of flow pipe 6. Flow pipe 6 may be of various configurations such as straight, a "T" configuration, an "H" configuration or may comprise a main header with side branches.

Trough 4 preferably extends horizontally in a first direction and is of a length corresponding to the diameter of the column or at least a substantial portion thereof. Trough 4 has opposing side walls 8 and 10 connected by a floor 12 and end walls 14 and 16. A plurality of discharge holes 18 are provided in floor 12 to deliver liquid to at least one distillation tray. In column 3, the trough is typically placed through the center of column 3 extending in a longitudinal direction. The trough preferably extends completely or substantially across the column and is supported at its ends by means such as an overlying ring welded to the inner surface of the shell. Other means of support can be used; such as intermediately positioned beams located above the trough, by attaching the trough to the flow pipe, and by a distributor support grid. The size and specific configuration of the trough can be varied to meet the particular liquid and vapor load requirements of intended applications.

Trough 4 includes a plurality of spaced apart liquid discharge holes 18 that are located in floor 12. Discharge holes 18 are preferably positioned in a pre-selected pattern customized to the specific column and distillation tray. The pattern of discharge holes 18 extend along the length of trough 4. The discharge holes 18 are normally circular and are of the same size, but can be other shapes and of differing sizes. Liquid passes through discharge holes 18 and descends onto distillation tray or packed bed distributor 35 also housed within column 3 (details of distillation tray or packed bed distributor are not shown).

Trough 4 of liquid distributor 2 houses a perforated v-plate 20 which extends along the length of the trough. V-plate 20 allows for venting of vapor while at the same time reduces or eliminates turbulence and momentum in the liquid. As with discharge holes 18, the perforations 22 of v-plate 20 are normally circular and are of the same size, but can be other shapes and of differing sizes. The perforations are of sufficient size to both accomplish the dividing function but at the same time not unduly back up and accumulate liquid in the v-plate. Perforations 22 may be arranged in any pattern but are preferably spaced apart in a uniform pattern extending over the complete surface of v-plate 20. In one embodiment of the invention, perforations 22 provide up to about 40% of the surface area of the v-plate as open area for liquid to pass through v-plate 20. V-plate 20 extends into the volume created by trough 4, but not so far as to contact floor 12 of trough 4. It is preferred for the base of v-plate 20 to be adjacent to but above the liquid head in trough 4. In one embodiment the base of the v-plate, i.e. the lower point of the v-plate, is about six inches from the floor of the trough. Of course, the dimensions may be altered depending upon the design.

Figure 5:
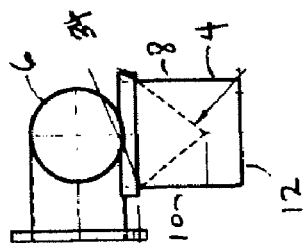
FIG. 5 is an end view of the liquid distributor assembly including the flow pipe, the v-plate, the dividers, and the trough.
Figure 4:
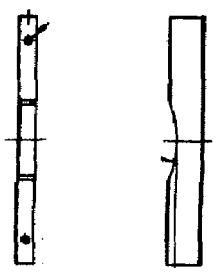
FIG. 4 is an end view of the bracket which supports the flow pipe of the liquid distributor assembly.
Figure 6:
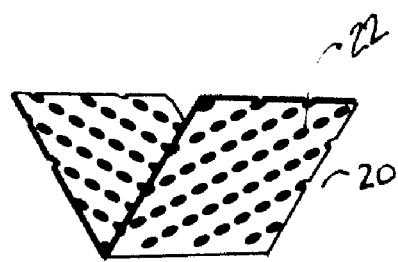
FIG. 6 is an enlarged fragmentary perspective view of the perforated v-plate of the liquid distributor assembly.
Figure 7:
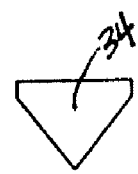
FIG. 7 is an end view of a divider of the liquid distributor assembly.
Figure 9A:
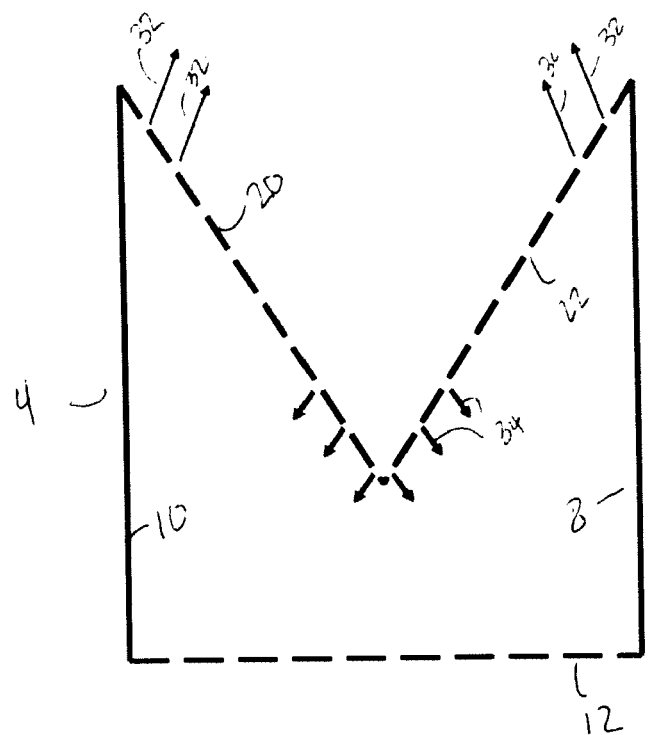
FIG. 9a is a sectional end view of one embodiment of the trough and the v-plate.
Figure 9B:
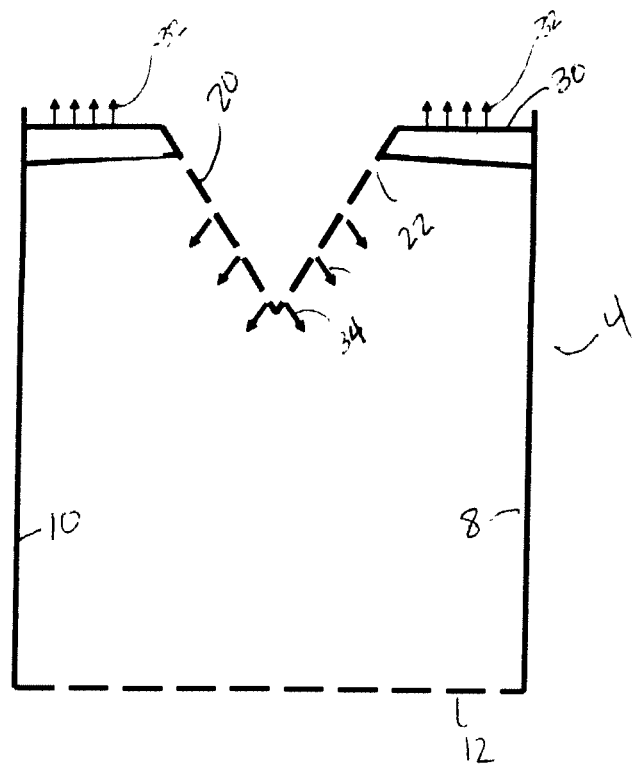
FIG. 9b is a sectional end view of another embodiment of the trough and the v-plate.
Figure 10:
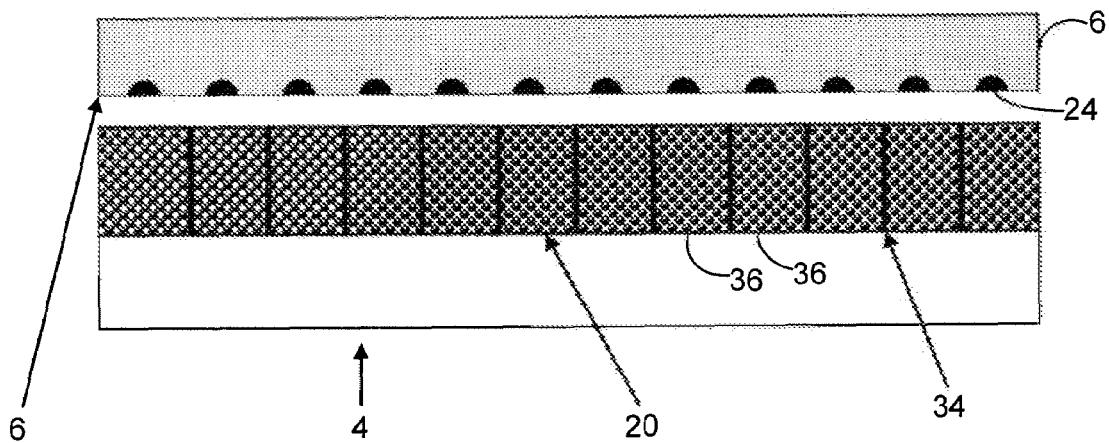
FIG. 10 is a sectional side view of the liquid distributor assembly.

In one embodiment, the v-plate spans the width of trough 4 extending from sidewall 8 to sidewall 10, see FIG. 5. In another embodiment, the v-plate is supported within trough 4, but does not extend from sidewall 8 to sidewall 10. Instead, bracing 30 is used to support the v-plate within the volume of trough 4. FIGS. 9a and 9b show an enlarged comparison of two different embodiments of the invention. FIG. 9a shows v-plate 20 extending from sidewall 8 to sidewall 10. FIG. 9b shows v-plate 20 supported by bracing 30 instead of extending from sidewall 8 to sidewall 10. Each design allows for proper venting through the trough. In FIG. 9a, perforations 22 in v-plate 20 which are adjacent to the top of sidewalls 8 and 10 allow for vapor to pass through the v-plate which is shown by arrows 32. Perforations 22 in v-plate 20 which are adjacent to the base of v-plate 22 allow for liquid to pass through the v-plate which is shown by arrows 34. In FIG. 9b, bracing 30 provides for vapor venting through the trough which is shown by arrows 32. Perforations 22 in v-plate 20 allow for liquid to pass through the v-plate which is shown by arrows 34.

Figure 8:
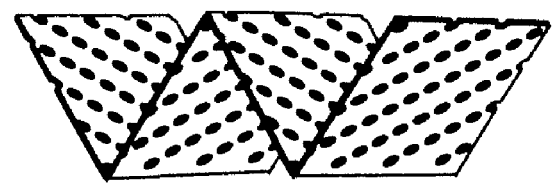
FIG. 8 is an enlarged fragmentary perspective view of the perforated v-plate of the liquid distributor assembly where the v-plate has a multiple of the v-shape, resulting in a w-shape.

Although not required, the greatest efficiency is achieved when the base of the v in the v-plate is positioned in alignment with the exit holes 24 of flow pipe 6. It is within the scope of the invention for the perforated v-plate to contain multiples of the v shape such as in a w shape, see FIG. 8. A w shape would be advantageous in situations such as when flow pipe 6 has two rows of exit holes. The plate would be positioned so that the base of the first v making up the w is in alignment with the first row of exit holes of the flow pipe, and the base of the second v making up the w is in alignment with the second row of exit holes of the flow pipe.

As a stream of fluid exits the flow pipe through an exit hole, the stream flows primarily vertically downward in a localized area under the exit hole. If the stream were to continue uninterrupted to the floor of the trough, the amount of fluid and the velocity of the fluid passing though different discharge holes of the trough would be different depending upon the location of the discharge hole. For example, a discharge hole in vertical alignment with an exit hole of the flow pipe might provide a greater volume of liquid at a higher velocity than a discharge hole that was not in alignment with an exit hole of the flow pipe. Furthermore, significant turbulence is generated by the liquid exiting the flow pipe and striking the floor of the trough. The turbulence further disrupts the liquid passing through the discharge holes of the trough. The present invention interrupts the stream of liquid from the exit hole of the fluid pipe before the floor of the trough by employing the v-plate. The v-plate operates to divide each stream of fluid exiting the flow pipe into a large number of small streams that are spread out evenly over the floor of the trough. Furthermore, the operation of dividing the large streams of fluid from the fluid pipe into many smaller streams results in decreasing the velocity of the liquid and equalizing the velocity of the many small streams that descend to the floor of the trough. Dividing the large streams of fluid from the fluid pipe into many smaller streams also operates to significantly reduce the turbulence of the liquid at the floor of the trough. The overall result is more uniform and less turbulent distribution of liquid onto the floor of the trough which in turn allows for a more uniform distribution of liquid through the discharge holes of the floor as compared with other liquid distributor designs.

Depending upon the configuration and the velocity of the liquid in the flow pipe, the streams of liquid discharged from the exit holes of the flow pipe may have a horizontal component as well as the expected vertical component. Therefore, the stream may spray outwardly at an angle away from the vertical plane aligned with the exit hole from the flow pipe. The horizontal component of the liquid stream from the exit hole of the flow pipe, if left unchecked, might cause the liquid passing through the different perforations of the v-plate to have different directional flow momentum and create a liquid head imbalance. The small streams created by the v-plate would fail to provide a uniform distribution of liquid and would instead concentrate a large volume in portions of the trough depending upon the horizontal component of the momentum of different streams.

Figure 11:
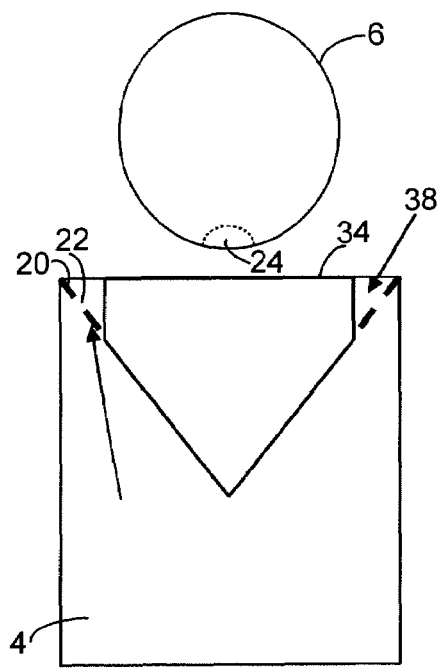
FIG. 11 is a sectional end view of the liquid distributor assembly.

To address this problem, one embodiment of the invention employs dividers 34 housed vertically within the volume created by v-plate 20. The dividers are spaced evenly along the length of the v-plate preferably in between exit holes of the flow pipe. Dividers 34 contact the v-plate at the base of the v-plate and at least partially up the sides of the v-plate to create zones 36 within the volume of v-plate 20. Dividers 34 are of sufficient height to reach the top of the trough and may extend vertically beyond v-plate 20 and trough 4 and into the spacing between flow pipe 6 and v-plate 20 as shown in FIG. 3. The contacting of dividers 34 with v-plate 20 is such that liquid does not flow between divider 34 and v-plate and does not flow from zone to zone, at least near to the base of v-plate 34. The dividers may be triangular shape to conform to shape of the volume created by v-plate 20 (FIG. 5) or dividers 34 may be in the shape of a five-sided polygon in order to define zonal overflow channels 38 (FIG. 11). Zonal overflow channels 38 would allow liquid to flow from zone to zone, but only in the situation where the liquid head in one zone rises unusually high, to the level of zonal overflow channel 38. This would prevent overflow of the trough in situations such as upsets, debris blocking perforations in the v-plate and the like. As long as the level of liquid remains below zonal overflow channels 38, liquid flow between zones 36 are blocked by dividers 34. When the liquid exiting flow pipe 6 has a horizontal-component of momentum, the liquid will impact against divider 34, drain along the surface of divider 34, and be retained within a specific zone 36. The horizontal component of momentum is disrupted, and a more uniform distribution of liquid through perforations 22 is achieved.

EXAMPLE

To demonstrate the effectiveness of the invention, a comparison study was conducted. Three different systems were compared. The first system did not contain a v-plate. Instead, a horizontal, flat, perforated plate was installed within the trough to disrupt the flow of liquid from the exit holes of the flow pipe to the discharge holes in the floor of the trough. Similar systems are described in U.S. Pat. No. 5,209,875 and U.S. Pat. No. 5,573,714. The next system contained the v-plate of the current invention. The final system had the novel v-plate and additionally had dividers positioned vertically within the volume of the v-plate at locations in between the exit holes of the flow pipe. Each system was operated at identical conditions with identical liquid. The performance of each system was analyzed nine times: at three different liquid head depths and with three different discharge hole patterns in the floor of the trough. The three different discharge hole patterns are labeled Patterns A, B, and C. In each experiment, the flow rate of the liquid exiting the discharge holes in the floor of the trough was measured and the percent (Max/Min)−1 distribution calculation was performed. The smaller the percent distribution, the more uniform the liquid distribution. The data collected is found in the Table.

TABLE

| | No V-Plate | | | V-Plate | | | V-Plate with Dividers | | |
|---|---|---|---|---|---|---|---|---|---|
| | Liquid Head Depth (inches) | | | | | | | | |
| | 2 | 6 | 10.5 | 2 | 6 | 10.5 | 2 | 6 | 10.5 |
| Pattern A | 62% | 21% | 10% | 49% | 13% | 3% | 21% | 10% | 6% |
| Pattern B | 149% | 138% | 13% | 101% | 48% | 12% | 45% | 25% | 3% |
| Pattern C | 485% | 485% | 18% | 138% | 58% | 20% | 147% | 18% | 13% |

As the data shows, the v-plate and the v-plate with dividers showed superior performance compared to another liquid distributor. In all but one of the experiments both the liquid distributors having the v-plate showed more uniform flow rates than the liquid distributor with no v-plate. Often times, the improvement was dramatic. This example demonstrates that in specific applications, utilizing the v-plate or a v-plate with dividers can increase the uniformity of the liquid distribution.

What is claimed is:

1. A process for distributing liquid comprising:
   a) conducting liquid through a flow pipe
   b) discharging the liquid from the flow pipe through a series of exit holes in the flow pipe
   c) passing the discharged liquid through perforations in a v-plate and into an elongated trough having spaced apart first and second sidewalls interconnected by a floor, said floor having a plurality of liquid discharge holes wherein the v-plate is positioned between the first and second sidewalls of the trough; and
   d) passing the liquid though the liquid discharge holes in the floor of the trough.

2. The process of claim 1 further comprising contacting the liquid from the liquid discharge holes in the floor of the trough with at least one distillation tray or one packed bed distributor.

3. The process of claim 1 further comprising, guiding the liquid discharged from the flow pipe into zones of the v-plate and restricting at least a portion of the liquid flow between zones, wherein the zones are defined by dividers positioned vertically within the volume defined by the v-plate and spaced in between the exit holes of the flow pipe.

4. The process of claim 3 wherein a portion of the liquid in a first zone is passed to a second zone through a zonal overflow channel defined by a divider and the v-plate.

5. The process of claim 3 wherein the liquid, after passing though the liquid discharge holes in the floor of the trough, has virtually no horizontal momentum component.

6. The process of claim 3 wherein the liquid, after passing though the liquid discharge holes in the floor of the trough, has virtually no turbulence.

7. The process of claim 1 wherein the liquid, after passing though the liquid discharge holes in the floor of the trough, is uniformly distributed over a distillation tray or packed bed distributor.

8. The process of claim 1 further comprising venting vapor through the v-plate.

* * * * *

UNITED STATES PATENT AND TRADEMARK OFFICE
CERTIFICATE OF CORRECTION

PATENT NO. : 7,445,199 B2 Page 1 of 1
APPLICATION NO. : 11/468328
DATED : November 4, 2008
INVENTOR(S) : Daniel R. Monkelbaan It is certified that error appears in the above-identified patent and that said Letters Patent is hereby corrected as shown below:

Column 8,
Line 52, replace "5. The process of claim 3 wherein the liquid, after passing though the liquid discharge holes"
with --5. The process of claim 3 wherein the liquid, after passing through the liquid discharge holes--.

Column 8,
Line 54, replace "6. The process of claim 3 wherein the liquid, after passing though the liquid discharge holes"
with --6. The process of claim 3 wherein the liquid, after passing through the liquid discharge holes--.

Column 8,
Line 57, replace "7. The process of claim 1 wherein the liquid, after passing though the liquid discharge holes"
with --7. The process of claim 1 wherein the liquid, after passing through the liquid discharge holes--.

Signed and Sealed this

Twenty-third Day of December, 2008

JON W. DUDAS
*Director of the United States Patent and Trademark Office*